United States Patent
Boucard et al.

(10) Patent No.: US 7,639,704 B2
(45) Date of Patent: Dec. 29, 2009

(54) MESSAGE SWITCHING SYSTEM

(75) Inventors: Philippe Boucard, Le Chesnay (FR);
Luc Montperrus, Montigny le Bretonneux (FR)

(73) Assignee: Arteris, Guyancourt (FR)

( * ) Notice: Subject to any disclaimer, the term of this patent is extended or adjusted under 35 U.S.C. 154(b) by 483 days.

(21) Appl. No.: 11/484,837

(22) Filed: Jul. 11, 2006

(65) Prior Publication Data

US 2007/0248097 A1 Oct. 25, 2007

(30) Foreign Application Priority Data

Mar. 31, 2006 (FR) .................................. 06 02810

(51) Int. Cl.
*H04L 12/28* (2006.01)
*H04L 12/56* (2006.01)

(52) U.S. Cl. ...................................... 370/412; 370/413

(58) Field of Classification Search ........................ None
See application file for complete search history.

(56) References Cited

U.S. PATENT DOCUMENTS

| | | | |
|---|---|---|---|
| 2,243,851 A | 6/1941 | Booth et al. | |
| 5,157,654 A * | 10/1992 | Cisneros | ...................... 370/414 |
| 5,313,649 A | 5/1994 | Hsu et al. | |
| 5,424,590 A | 6/1995 | Sato et al. | |
| 5,495,197 A | 2/1996 | Hayashi et al. | |
| 5,541,932 A | 7/1996 | Nguyen et al. | |
| 5,604,775 A | 2/1997 | Saitoh et al. | |
| 5,651,002 A | 7/1997 | Van Seters et al. | |
| 5,764,093 A | 6/1998 | Hayashi et al. | |
| 5,784,374 A * | 7/1998 | Runaldue | ...................... 370/414 |
| 5,844,954 A | 12/1998 | Casasanta et al. | |
| 5,896,380 A * | 4/1999 | Brown et al. | ................. 370/388 |
| 5,931,926 A | 8/1999 | Yeung et al. | |
| 6,151,316 A | 11/2000 | Crayford et al. | |
| 6,211,739 B1 | 4/2001 | Synder et al. | |
| 6,260,152 B1 | 7/2001 | Cole et al. | |
| 6,339,553 B1 | 1/2002 | Kuge | |
| 6,400,720 B1 | 6/2002 | Ovadia et al. | |

(Continued)

FOREIGN PATENT DOCUMENTS

EP 752642 1/1997

(Continued)

OTHER PUBLICATIONS

Olsson et al., "A Digital PLL made from Standard Cells" Proceedings from European Conference on Circuit Theory and Design (ECCTD) 2001, 4 pages.

(Continued)

*Primary Examiner*—Dang T Ton
*Assistant Examiner*—Frederick Ott
(74) *Attorney, Agent, or Firm*—Fish & Richardson P.C.

(57) ABSTRACT

The message switching system (51) comprises at least two inputs (52, 53, 54, 55) and at least one output (56), first arbitration means (62) dedicated to said output (56), and management means (64) designed to determine a relative order OR(i,j) of one input relative to the other, for any pair of separate inputs belonging to the system (51) and having sent requests for the assignment of said output (56), and designed to assign said output (56). Said management means (64) comprise storage means (70) designed to store said relative orders OR(i,j), initialization means (66) designed to initialize said relative orders OR(i,j) such that only one of said inputs takes priority on initialization, and updating means (68) designed to update all of said relative orders when a new request arrives at said first arbitration means (62), or when said output is assigned to one of said inputs.

16 Claims, 6 Drawing Sheets

| | | | |
|---|---|---|---|
| 6,549,047 B2 | 4/2003 | Yamazaki et al. | |
| 6,625,160 B1 * | 9/2003 | Suzuki | 370/413 |
| 6,661,303 B1 | 12/2003 | Ghoshal | |
| 6,721,309 B1 | 4/2004 | Stone et al. | |
| 6,738,820 B2 | 5/2004 | Hilt | |
| 6,759,911 B2 | 7/2004 | Gomm et al. | |
| 6,812,760 B1 | 11/2004 | Kim et al. | |
| 6,850,542 B2 | 2/2005 | Tzeng | |
| 6,901,074 B1 | 5/2005 | Yamasaki | |
| 6,915,361 B2 | 7/2005 | Alpert et al. | |
| 7,050,431 B2 | 5/2006 | Tzeng | |
| 7,092,360 B2 * | 8/2006 | Saint-Hilaire et al. | 370/241 |
| 7,148,728 B2 | 12/2006 | Montperrus et al. | |
| 7,321,594 B2 * | 1/2008 | Murakami et al. | 370/412 |
| 2002/0085582 A1 | 7/2002 | Kim | |
| 2002/0196785 A1 | 12/2002 | Connor | |
| 2003/0227932 A1 | 12/2003 | Meempat et al. | |
| 2004/0017820 A1 | 1/2004 | Garinger et al. | |
| 2004/0128413 A1 | 7/2004 | Chelcea et al. | |
| 2005/0025169 A1 | 2/2005 | Douady et al. | |
| 2005/0086412 A1 | 4/2005 | Douady et al. | |
| 2005/0104644 A1 | 5/2005 | Montperrus et al. | |
| 2005/0141505 A1 | 6/2005 | Douady et al. | |
| 2005/0154843 A1 | 7/2005 | Douady et al. | |
| 2005/0157717 A1 | 7/2005 | Douady et al. | |
| 2005/0210325 A1 | 9/2005 | Douady et al. | |
| 2007/0002634 A1 | 1/2007 | Montperrus | |

FOREIGN PATENT DOCUMENTS

| | | |
|---|---|---|
| FR | 2814007 | 3/2002 |
| WO | 0195089 | 12/2001 |

OTHER PUBLICATIONS

OIsson et al., "Fully integrated standard cell digital PLL" Electronic Letters, vol. 37, No. 4, Feb. 15, 2001, pp. 211-212.

OIsson et al., "A Digitally Controlled PLL for Digital SOCs" IEEE International Symposium on Circuits and Systems, 2003, 4 pages.

Co-pending U.S. Appl. No. 11/399,293 entitled "System and Method of On-Circuit Asynchronous Communication, Between Synchronous Subcircuits" filed Apr. 6, 2006, available in PAIR.

Co-pending U.S. Appl. No. 11/407,391 entitled "System and Method for the Static Routing of Data Packet Streams in an Interconnect Network" filed Apr. 19, 2006, available in PAIR.

Co-pending U.S. Appl. No. 11/482,175 entitled "System of Interconnections for External Functional Blocks on a Chip Provided With a Single Configurable Communication Protocol" filed Jul. 6, 2006, available in PAIR.

Co-pending U.S. Appl. No. 11/483,419 entitled "Process for Designing a Circuit for Synchronizing Data Asynchronously Exchanged Between Two Synchronous Blocks, and Synchronization Circuit Fabricated by Same" filed Jul. 7, 2006, available in PAIR.

Co-pending U.S. Appl. No. 11/516,811 entitled "System and Method for Managing Messages Transmitted in an Interconnect Network" filed Sep. 6, 2006, available in PAIR.

Co-pending U.S. Appl. No. 11/518,384 entitled "System for Managing Messages Transmitted in an On-Chip Interconnect Network" filed Sep. 8, 2006, available in PAIR.

Rapport de Recherche Preliminaire for FR 0602810, mailed Nov. 6, 2006; 2 pages.

Cheung et al. ,"Fuzzy Service Scheduling Scheme in ATM Networks", IEEE, Jun. 11, 2001, pp. 3122-3123.

* cited by examiner

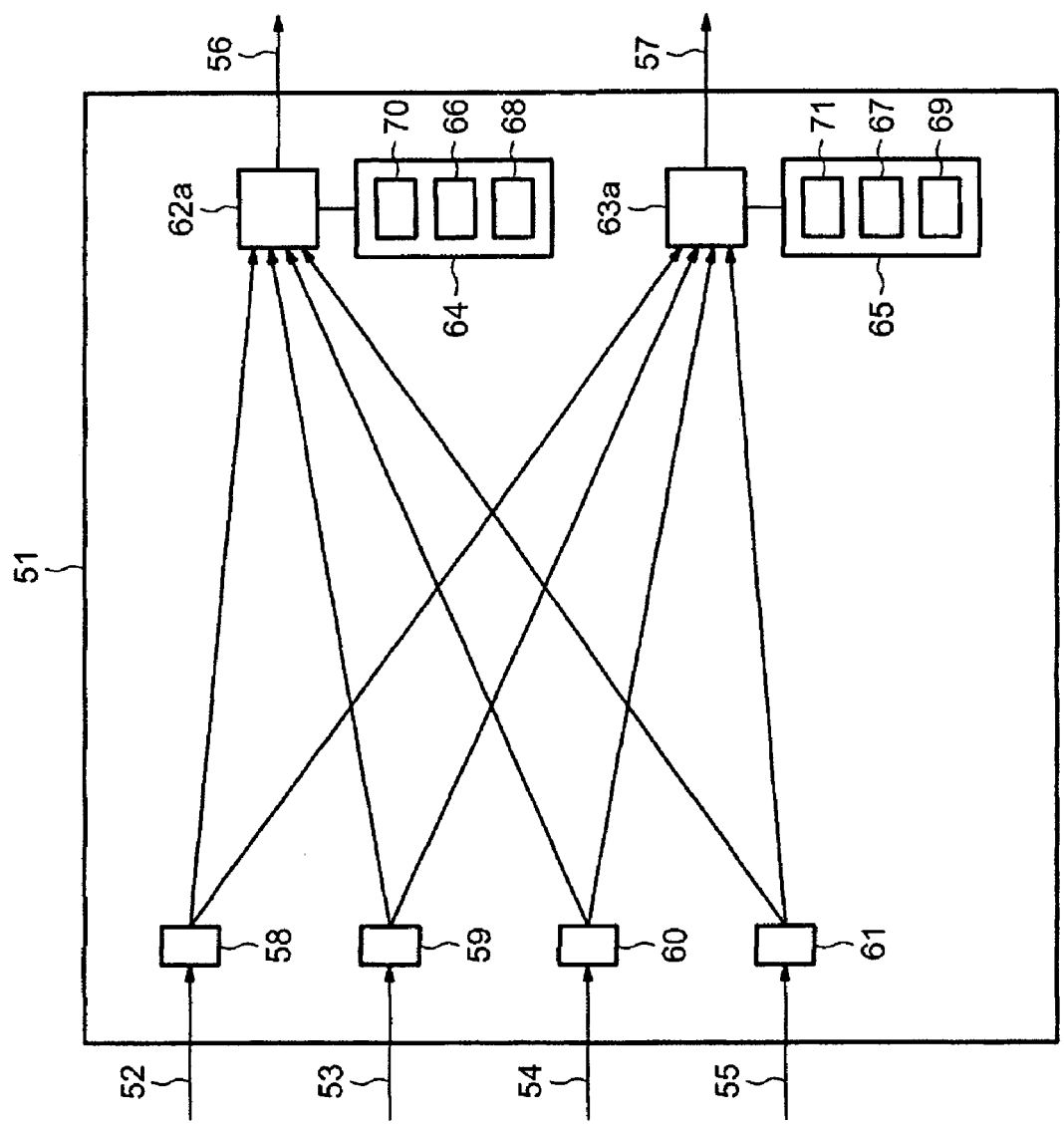

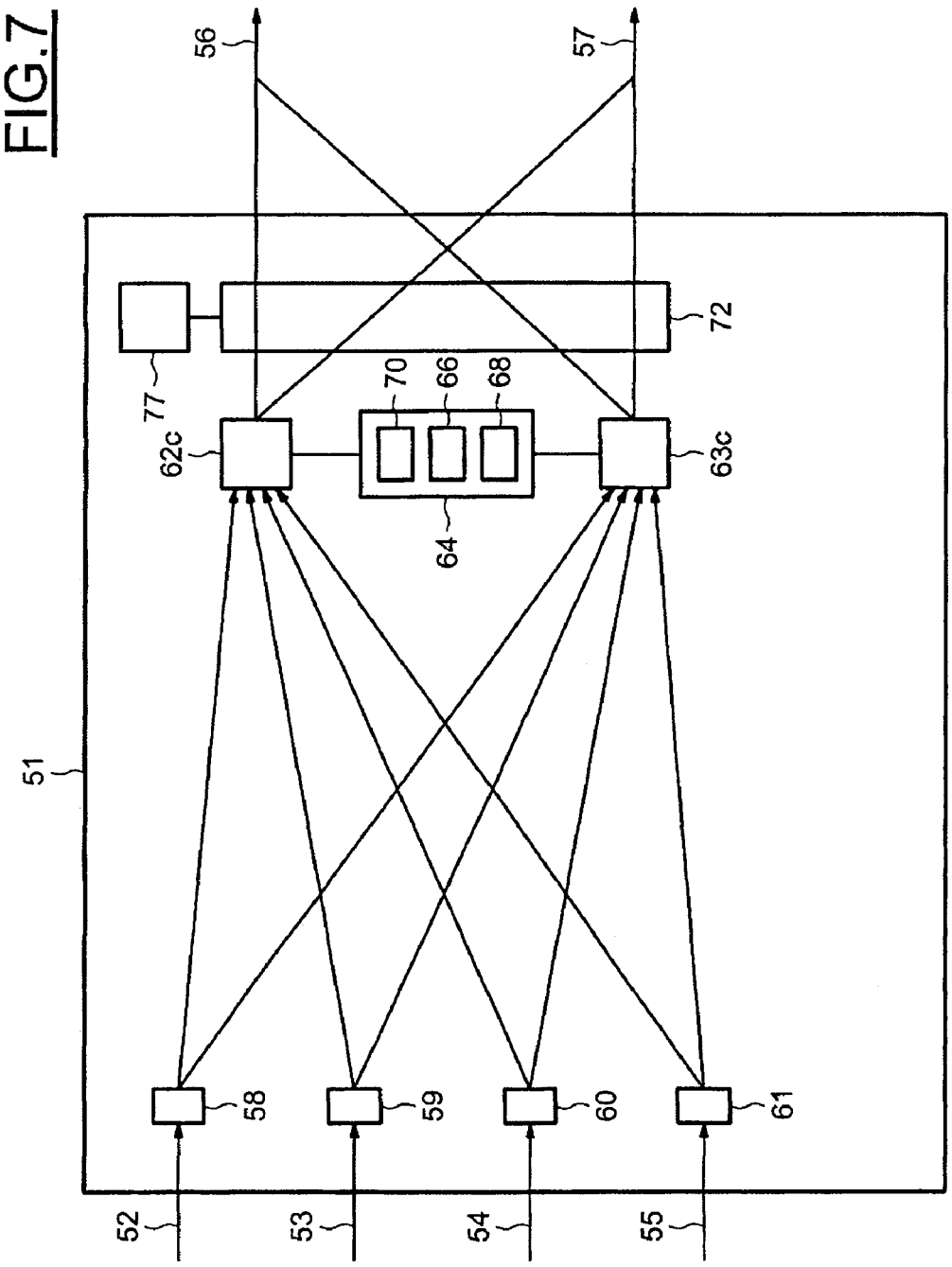

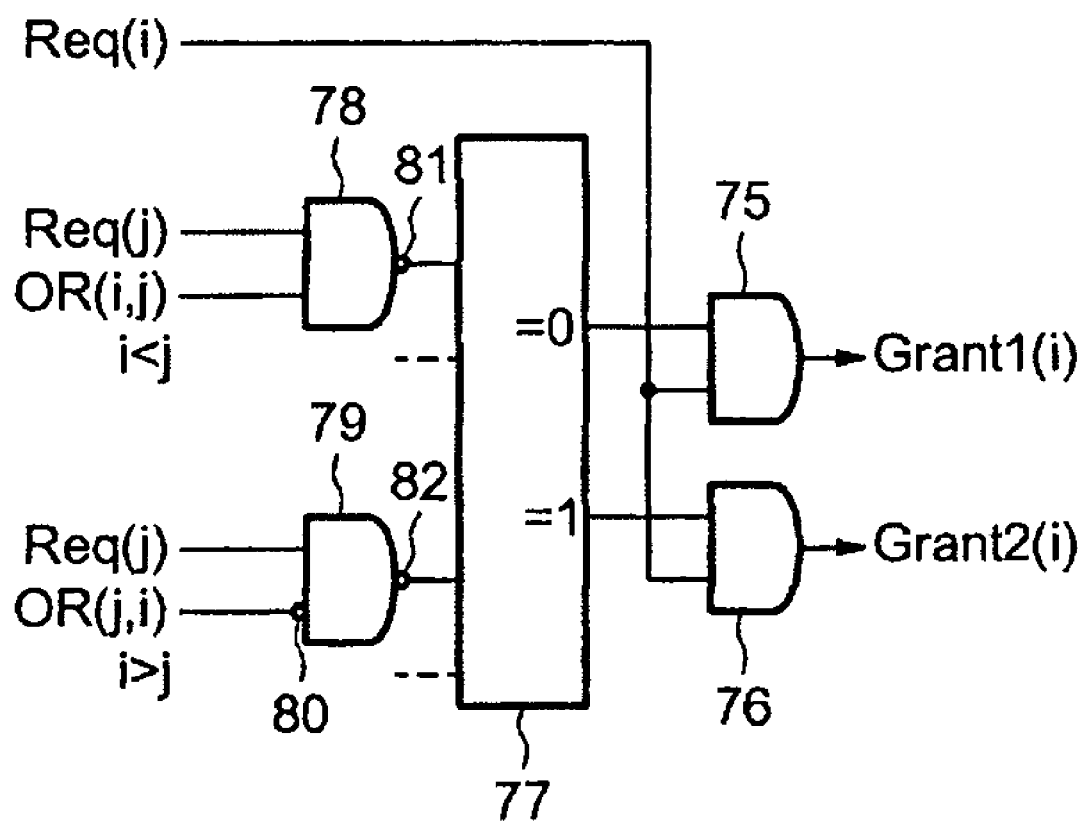

MESSAGE SWITCHING SYSTEM

The present invention relates to a message switching system comprising at least two inputs and at least one output.

In a communication network on silicon chip (network on chip) linking numerous agents of the network, resources are pooled in order to obtain the best trade-off between network cost and performance.

In practice, directly linking two agents of the network when there are data interchanges between these agents would be excessively expensive. The data interchanges are grouped on common links in order to make best use of the performance of each link of the network. Such resource sharing requires the presence of arbitration elements or decision-making elements on the switches present at nodes of the network.

A switch is used to converge as input the data transferred over a number of links, and transfer it over a plurality of output links.

The data circulating on such links is in the form of data packets comprising a header and useful data. The header contains header data for routing or directing the packet through the network and can, if necessary, contain priority information concerning the data packets.

A switch includes a routing device which determines, for a packet arriving at an input of the switch, the output of the switch to which the packet is intended, according to header data in the packet header.

Furthermore, each output of the switch includes an arbitration device which decides, for the corresponding output, which packet will be assigned to it, in particular in cases of conflict between a number of data packets.

In the description that follows, the term "output assignment request" will be used to mean a request sent by an input, or, more specifically, by the logic associated with an input of the switch, according to data packets present at the inputs, and addressed to an arbitration device associated with an output.

An arbitration device decides, at a given instant, to which input, out of a plurality of inputs at which data packets are present and intended for the corresponding output, it must assign the output. When the output is available, it then notifies the chosen input, and the waiting data packet can then be transmitted by the associated output.

When the output bandwidth is not yet saturated, any types of arbitration criteria can be chosen, and particularly the most economical, such as the fixed priority or the random assignment of the output.

The effectiveness of an arbitration device is therefore judged in particular in cases of conflicting assignment of an output when the bandwidth is saturated on that output.

A good trade-off for dimensioning a network consists in having most of the time an unsaturated bandwidth, and to cope with occasional data interchange peaks resulting in a saturation of certain bandwidths, in having a system enabling such emergency conditions to be managed.

Various arbitration devices tending to overcome this type of problem exist.

For example, "round-robin" type arbitration devices use a fixed, rotating relative order for the inputs of a switch. After each assignment of the output, the minimum relative order is assigned to the next input in the circular list of inputs, or even better, to the input that has just had the output assigned.

However, such an arbitration device becomes costly and complicated when it involves handling a number of dynamic priority levels, because it is necessary to have a round-robin type arbitration for each priority level. Furthermore, the priorities are normally linked to a concept of service quality. There are normally few levels or degrees of priority, because the latter are associated with exceptional situations. The priority signals can be independent of the request signals and can therefore be positioned at any time. Furthermore, there can be retraction both on the request signals and on the priority signals.

It is necessary to have a rapid arbitration, because the request or priority signals arrive late in the clock cycle.

For example, arbitration devices serve the output assignment requests sent by inputs in their order of arrival (FCFS, for "first-come-first-served", or LRU for "least recently used"). Such an arbitration device uses queues or counters.

However, if it is necessary to handle a number of requests arriving simultaneously, or if a high priority request arriving late needs to be assigned rapidly, it is then very difficult to rapidly update the queues used.

Such arbitration devices present problems of cost or effectiveness.

Thus, one object of the invention is to obtain a message switching system implementing an effective arbitration in the case of output bandwidth usage peaks, at low cost.

Thus, according to one aspect of the invention, there is proposed a message switching system comprising at least two inputs and at least one output, first arbitration means dedicated to said output, and management means designed to determine a relative order OR(i,j) of one input relative to the other, for any pair of separate inputs belonging to the system and having sent requests for the assignment of said output. The management means are also designed to assign said output. The said management means comprise storage means designed to store said relative orders OR(i,j), initialization means designed to initialize said relative orders OR(i,j) such that only one of said inputs takes priority on initialization, and updating means designed to update all of said relative orders when a new request arrives at said first arbitration means, or when said output is assigned to one of said inputs.

Such a system enables bandwidth usage peaks to be managed on the link connected to an output of a switch, effectively and inexpensively.

In practice, storing the relative orders is a way of significantly improving the speed of arbitration, and enables a system to be produced simply and inexpensively that combines the FCFS (first-come-first-served) and LRU (least recently used) mechanisms.

Thus, a perfect equity between the inputs is assured, and since the relative orders are known for all the pairs of inputs, they are known for all the pairs of a subset of inputs, which makes it possible to use an input filtering without damaging the output assignment equity.

Ensuring a perfect arbitration equity is a way of avoiding congestion in the network at switch level.

According to an embodiment, said management means are designed to assign the relative order OR(i,j) of one input relative to the other, for any pair of separate inputs belonging to the system, according to the order of arrival of the corresponding requests. The input for which the corresponding request has arrived first takes priority. Said management means are designed, when a number of requests arrive simultaneously, to assign the relative order of one input relative to the other, for any pair of separate inputs belonging to the system, such that one input takes priority over another input when said output has recently been assigned to said input before the last assignment of said output to the other input.

In an embodiment, the system also comprises filtering means designed to filter the or each output assignment request sent by inputs to said output by selecting the or each highest priority and identical priority requests out of the or each assignment request, when said requests can be of different priorities.

According to an embodiment, said management means are designed, when a single request is selected by said filtering means, to assign said output to said single request selected by said filtering means, and when a number of requests are selected by said filtering means and one of said selected requests has arrived before the others, to assign said output to said request arriving before the others out of the selected requests. Furthermore, said management means are designed, when a number of requests are selected by said filtering means and have arrived simultaneously before the other selected requests, to assign said output to the request having the relative order that is highest out of said requests arriving simultaneously before the others.

In an embodiment, said updating means are also designed to process a request, sent early by one of said inputs and disappearing before said output is assigned to it, as if said output had been assigned to it.

For example, the relative order OR(i,j) of a pair of separate inputs i,j belonging to the system is one when the input j takes priority over the input i, and zero when the input i takes priority over the input j.

For example, the relative order OR(i,j) of a pair of separate inputs i,j belonging to the system is zero when the input j takes priority over the input i, and one when the input i takes priority over the input j.

For example, said storage means are designed to store said relative orders OR(i,j), for any pair of inputs belonging to the system such that i<j.

For example, said storage means are designed to store said relative orders OR(i,j), for any pair of inputs belonging to the system such that i>j.

According to an embodiment, the system also comprises second arbitration means dedicated to a second output. Said first and second arbitration means are designed to determine the input, corresponding to a request, to which said second output is assigned, such that only one other input has a higher priority request.

The second arbitration means provide a different choice from that of the first arbitration means. Everything proceeds as if arbitration were being applied for a first time, and then a second time taking into account the first arbitration.

Such a double arbitration is very rapid, because it is not done by stacking two arbiters.

In an embodiment, the system also comprises third and fourth arbitration means, mounted in parallel forming a second double arbiter (63c), means of assigning said two outputs, cooperating with said first and second arbitration means mounted in parallel and forming a first double arbiter, and with said second double arbiter (63c). Said first double arbiter (62c) receives the priority requests, and said second double arbiter (63c) receives the non-priority requests, said requests having only two possible priority levels, priority or non-priority.

Such a double arbitration with priority filtering occupies a smaller area, because many elements of the system are shared by the arbitration means, which means that the critical computations can be performed in parallel at low cost.

According to an embodiment, when at least two priority requests are received by said first double arbiter, said assignment means assign said two outputs to the two priority requests having the highest relative orders.

In an embodiment, when a single priority request is received by said first double arbiter, said assignment means assign said two outputs to said priority request and to the non-priority request having the highest relative order received by said second double arbiter.

According to an embodiment, when no priority request is received by said first double arbiter, said assignment means assign said two outputs to the two non-priority requests having the highest relative orders received by said second double arbiter.

Other objects, features and advantages of the invention will become apparent from reading the description that follows, of a few by no means limiting examples, and given with reference to the appended drawings, in which:

FIG. 5 illustrates a message switching system according to an aspect of the invention;

FIG. 7 illustrates a message switching system according to an aspect of the invention; and FIG. 8 represents an exemplary embodiment of simultaneous determination of the signals for selecting the inputs $i_1$ and $i_2$ according to an aspect of the invention.

FIG. 1 illustrates how the relative orders OR(i,j) are processed.

Figure 1:
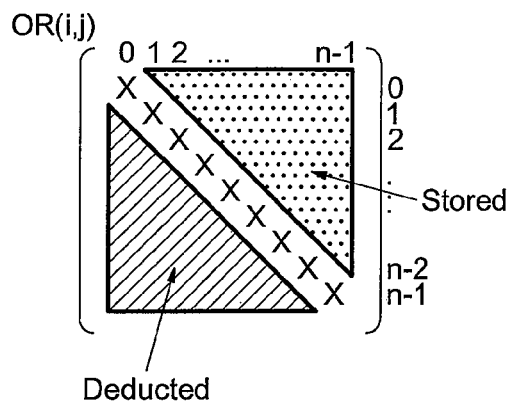
FIG. 1 illustrates the relative orders OR(i,j) assigned to the pairs of inputs of the system according to an aspect of the invention.

For each pair of inputs of an arbitration module dedicated to an output of a message switching system, the relative orders OR(i,j) of one input relative to the other, at a given instant, are stored. For an n-input arbitration, it is therefore necessary to store n(n-1)/2 values.

For example, if the inputs of an arbitration module, which are the inputs of the system, are numbered from 0 to n-1, then for i and j integers between 0 and n-1 and such that i is different to j, the relative order OR(i,j) of the input j over the input i is defined as 1 when the input j takes priority over the input i and 0 otherwise.

Naturally, it would also be possible to define the relative order OR(i,j) of the input j over the input i, as being 0 when the input j takes priority over the input i, and 1 otherwise.

It is then sufficient to store OR(i,j) only for i<j and take for OR(j,i) the inverse value of OR(i,j).

The term "inverse values" is used to mean the values 0 and 1.

Naturally, it would also be possible to store OR(i,j) only for i>j, and to take for OR(j,i) the inverse value of OR(i,j).

There follows a description of the case in which, for i and j integers between 0 and n-1 and such that i is different to j, the relative order OR(i,j) of the input j over the input i is defined as being 1 when the input j takes priority over the input i and 0 otherwise, and in which OR(i,j) is stored only for i<j, and for OR(j,i), the inverse value of OR(i,j) is taken.

On initialization, OR(i,j)=0 can arbitrarily be taken, regardless of i and j, and in this case at the outset, the input numbered 0 is higher priority than the input numbered 1, which is in turn higher priority than the input numbered 2 and so on.

The order of initialization can be anything but the OR(i,j) must, however, be consistent.

In practice, if OR(i,j)=OR(j,k)=OR(k,i), at the outset, there could be a situation in which no input is selected or even a more conflicting situation in which more than one input would be selected.

It is thus possible to calculate very rapidly the input assignment conditions from the moment when the requests are known.

Figure 2:
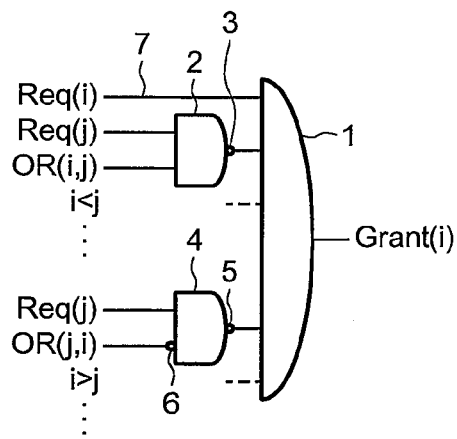
FIG. 2 represents an exemplary embodiment of determining the signal for selecting the input i according to an aspect of the invention.

FIG. 2 illustrates how the selection signal Grant(i) of the input i is calculated from the relative orders OR(i,j) of the other inputs relative to the input i.

For an input to be selected, there must be a request on that input and there must be no other request on a higher priority input.

The critical decision path beginning with requests is 1+log(n) gates. Only the OR(i,j) with i strictly less than and different to j are stored, with i therefore varying from 0 to n-2 and j varying from 1 to n-1, so there are therefore n(n-1)/2 coefficients to be stored.

The circuit is produced using a logical AND 1 and a logical AND 2 with signal inverter 3 at the output and a logical AND 4 with signal inverter at the output 5 and signal inverter 6 on the input corresponding to OR(i,j). The logical AND 1 receives at the input 7 the signal Req(i) representing the presence (1) or the absence (0) of request on the input i and its priority. The logical AND 1 also receives as input the inverted outputs of the logical ANDs 2 and 4. Thus, for each signal Grant(i), one logical AND 1 and a plurality of logic gates 2, 3, 4, 5 and 6 are necessary.

Arbitration cannot be any faster, because log(n) gates is the optimum number of logic gates.

Figure 3:
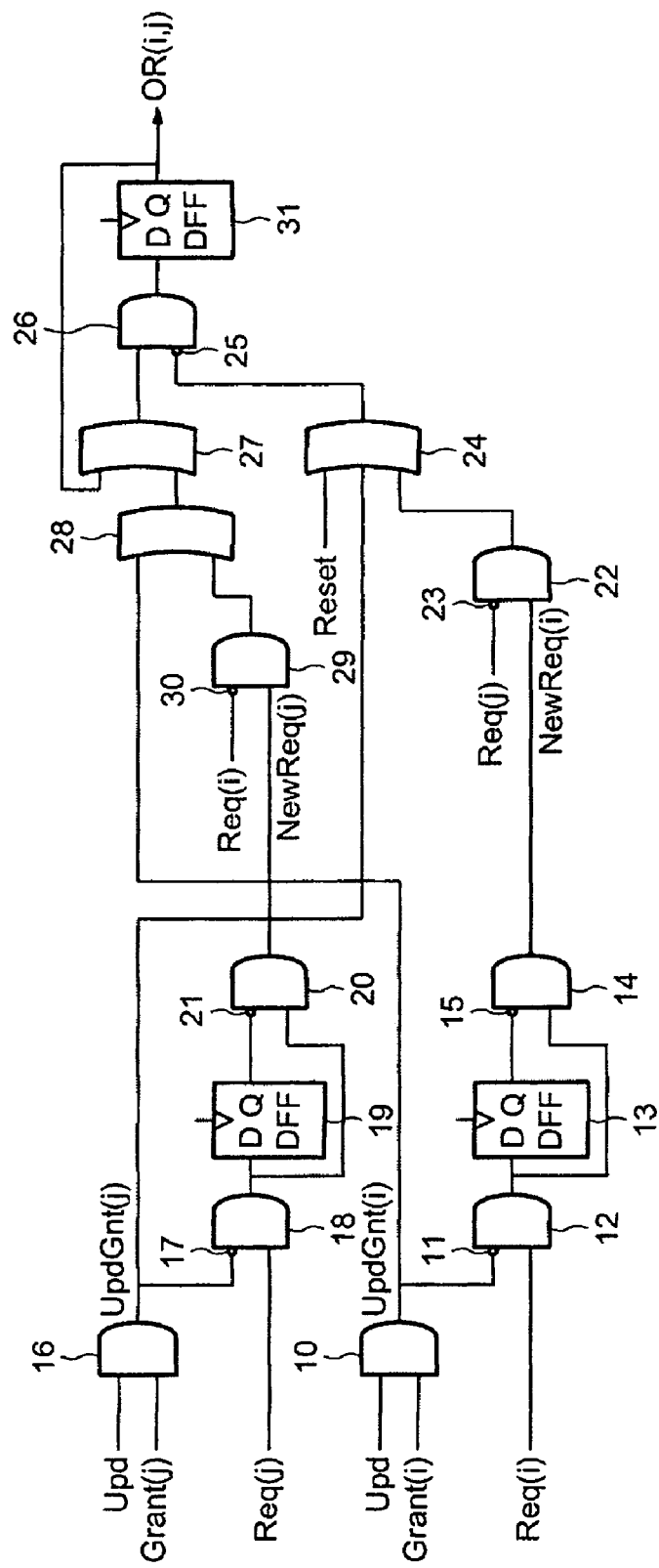
FIG. 3 represents an embodiment of the means of updating relative orders OR(i,j), according to an aspect of the invention.

As illustrated in FIG. 3, the relative orders OR(i,j) are modified, either on arrival of each new request on the inputs i or j, or when an assignment of the output is performed in favour of one of these two inputs i or j. When a request arrives and obtains the output in the same cycle, it is not considered as a new request, in other words, the corresponding signal NewReq does not switch to 1.

The priorities OR(i,j) are updated when a new request arrives on the input i or j or when the assignment of the output is done on the input i or j. This makes it possible to take account of both the age of the requests, because their order of sending is retained through the corresponding OR(i,j), and the order in which the inputs have been served (output assigned) although there are no longer requests on these inputs.

For example, if a new request is defined as being a request not present in the preceding clock cycle, but not acknowledged in the current cycle, the value 0 is assigned to OR(i,j) when the output is assigned to the input j or when there is a new request on the input i and no request on the input j, and the value 1 is assigned to OR(i,j) when the output is assigned to the input i or when there is a new request on the input j and no request on the input i.

Thus, the advantages of the FCFS and LRU methods are combined, so ensuring a perfect equity in the assignment of the output. Furthermore, if this new implementation is compared with the existing solutions, excellent performance is obtained for a low cost in terms of number of logic gates.

The output is assigned only when the output link is free, the signal Upd is used to validate this assignment based on the choice made, identified by the single active Grant(i). The signals UpdGnt(i) and NewReq(i) are then calculated for each input. The signal NewReq(i) represents the new-request state of the request of the input i, and the signal UpdGnt(i) is representative of the fact that the input i has been chosen and that the output is ready to process the request associated with that input.

By not modifying the relative orders OR(i,j) of the old requests, the order of arrival of the requests is retained. Returning OR(i,j) to 1 when UpdGnt(i) is 1 or OR(i,j) to 0 when UpdGnt(j) is 1, is tantamount to assigning the lowest relative order to the input that has just been assigned the output, so, when, subsequently, two new assignment requests arrive simultaneously on their respective input, the order between them is fixed according to the times elapsed since they were last respectively assigned the output, the input to which the output has been assigned most recently being the lower priority.

The arrival of a new request on one of the inputs can compromise its relative order relative to the other inputs. If, on the other input, there is also a request, then the relative order has not to be modified even if it is also a new request, but, in the case where there is no request on the other input, this new request becomes a priority. OR(i,j) is set to 0 if there is NewReq(i) and not Req(j), and, symmetrically, OR(i,j) is set to 1 if there is NewReq(j) and not Req(i).

The assignment of the output to a request that has just arrived causes the corresponding input to be set to the minimum relative order whatever the state of the other inputs, so there is no benefit to be gained in handling this type of situation in the same way as new requests. The fact that a number of new requests arrive simultaneously therefore poses no problem.

Apart from initialization where an arbitrary order is fixed between the inputs, subsequently the relative orders are fixed so as to service the requests as equitably as possible.

This is performed, for example, as illustrated in FIG. 3.

When requests are submitted early, and can therefore, possibly disappear before obtaining the output, these requests are handled as if the output had been assigned to them.

Thus, a rapid, inexpensive, equitable arbitration is obtained, being able to manage several dynamic priority levels, and which retains both the order of the requests and the order of the assignments of the output, so ensuring a better regulation of the traffic for the network.

Thus, a logical AND 10 receives as input the values Upd and Grant(i) and delivers as output the value UpdGnt(i). The value UpdGnt(i) is duplicated on an inverter 11 at the input of a logical AND 12. The logical AND 12 also receives as input the value Req(i). The output signal of the logical AND 12 is, on the one hand, transmitted to a flip-flop 13, and, on the other hand, to a logical AND 14. The output of the flip-flop 13 is transmitted to the logical AND 14 after inversion by an inverter 15. UpdGnt(i) is 1 when the output is free to satisfy a waiting request.

Similarly, a logical AND 16 receives as input the values Upd and Grant(j) and delivers as output the value UpdGnt(j). The value UpdGnt(j) is duplicated on an inverter 17 at the input of a logical AND 18. The logical AND 18 also receives as input the value Req(j). The output signal of the logical AND 18 is, on the one hand, transmitted to a flip-flop 19 and, on the other hand, to a logical AND 20. The output of the flip-flop 19 is transmitted to the logical AND 20 after inversion by an inverter 21.

The output of the logical AND 14 is transmitted as input to a logical AND 22, also receiving as input Req(j) inverted by an inverter 23. The output of the logical AND 22 is transmitted to a logical OR 24, also receiving, as input, UpdGnt(j) output from the logical AND 16, and a reset signal Reset.

The output of the logical OR 24 is transmitted after inversion by an inverter 25 to a logical AND 26. The logical AND 26 also receives as input the output of the logical OR 27.

The logical OR 27 receives as input the output of a logical OR 28 receiving as input UpdGnt(i) delivered by the logical AND 10 and the output of a logical AND 29.

The logical AND 29 receives as input, on the one hand, NewReq(j) delivered by the logical AND 20 and, on the other hand, Req(i) inverted by an inverter 30.

The output of the logical AND 26 is transmitted to a flip-flop 31, which delivers as output OR(i,j). The signal OR(i,j) is transmitted by a feedback loop as input to the logical OR 37.

Figure 4:
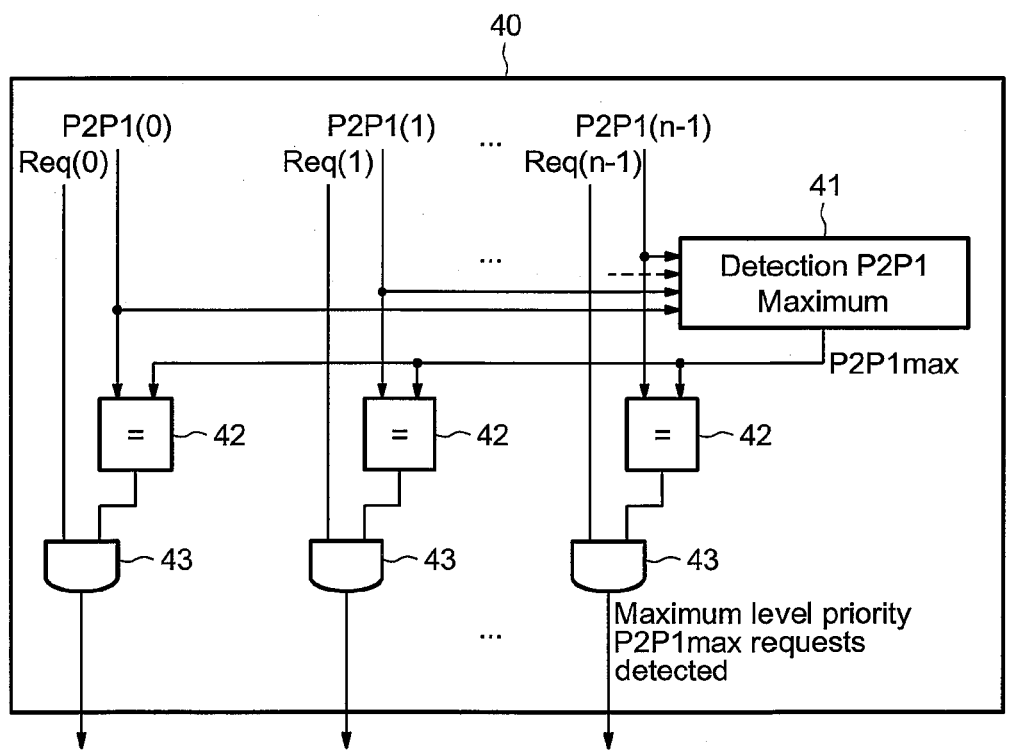
FIG. 4 represents an embodiment of the filtering means, according to an aspect of the invention.

FIG. 4 illustrates an embodiment of a filtering module 40 that can be used before an arbitration module dedicated to a single output, according to one aspect of the invention.

P1 and P2 are two signals for encoding a priority level, for a small number of priority or service quality levels, which is the usual case. In other words, when there is no urgency or priority, P2P1=00 (level 0), when there is a low level urgency, P2P1=01 (level 1) and when there is a high level urgency, P2P1=11 (level 2), which makes it possible to rapidly determine the maximum priority level P1P2max.

The requests are then filtered according to the maximum priority detected. Only those that have this maximum priority level are retained.

Then, out of the filtered requests, the oldest or, by default, the one whose input was last serviced a long time ago, is chosen.

Thus, an arbitration that takes account of dynamic priorities, or the age of the requests Req(i) or of the age of the assignments UpdGnt(i) is produced. The result is a very rapid and very equitable solution.

FIG. 4 illustrates an exemplary embodiment of a filtering module 40 comprising a module 41 for detecting the maximum priority level, comparators 42 for establishing, for each request Req(i), whether the priority of the request Req(i) is equal to said maximum priority detected by the detection module 41.

The output of each comparator 42 is transmitted to the input of a logical AND 43 which also receives as input Req(i).

At the output, the maximum level priority requests are detected.

To support early requests and therefore the possibility of retraction, it is enough to consider that the requests that have disappeared are handled like the one that has been selected and validated (the one with UpdGnt(i)=1).

The following notation conventions apply:

~A is the logical inverse of A
& and | are logical AND and logical OR operations
Reg(A) is the logical value of A in the preceding cycle.

With the same definition for NewReq(i)=Req(i)&~UpdGnt(i) &~Reg(Req(i)&~UpdGnt(i)), AutoGnt(i) is defined as being 1 after a retraction:

AutoGnt(i)=~Req(i)&Reg(Req(i)&~UpdGnt(i))

There is then introduced the concept of generalized full Grant: FullGnt(i)=UpdGnt(i)|AutoGnt(i) which is one when a request has been handled or has disappeared. The FullGnt(i) replaces the old UdpGnt(i) in the update equations of OR(i,j). In the case where FullGnt(i) and FullGnt(j) are both 1, OR(i,j) does not change. The new equations are therefore:

OR(i,j) set to 1 if ~FullGnt(j)&(FullGnt(i)|(NewReq(j)& ~Req(i)))

OR(i,j) set to 0 if [~FullGnt(i)&(FullGnt(j)|(NewReq(j)& ~Req(j)))]|Reset

Figure 6:
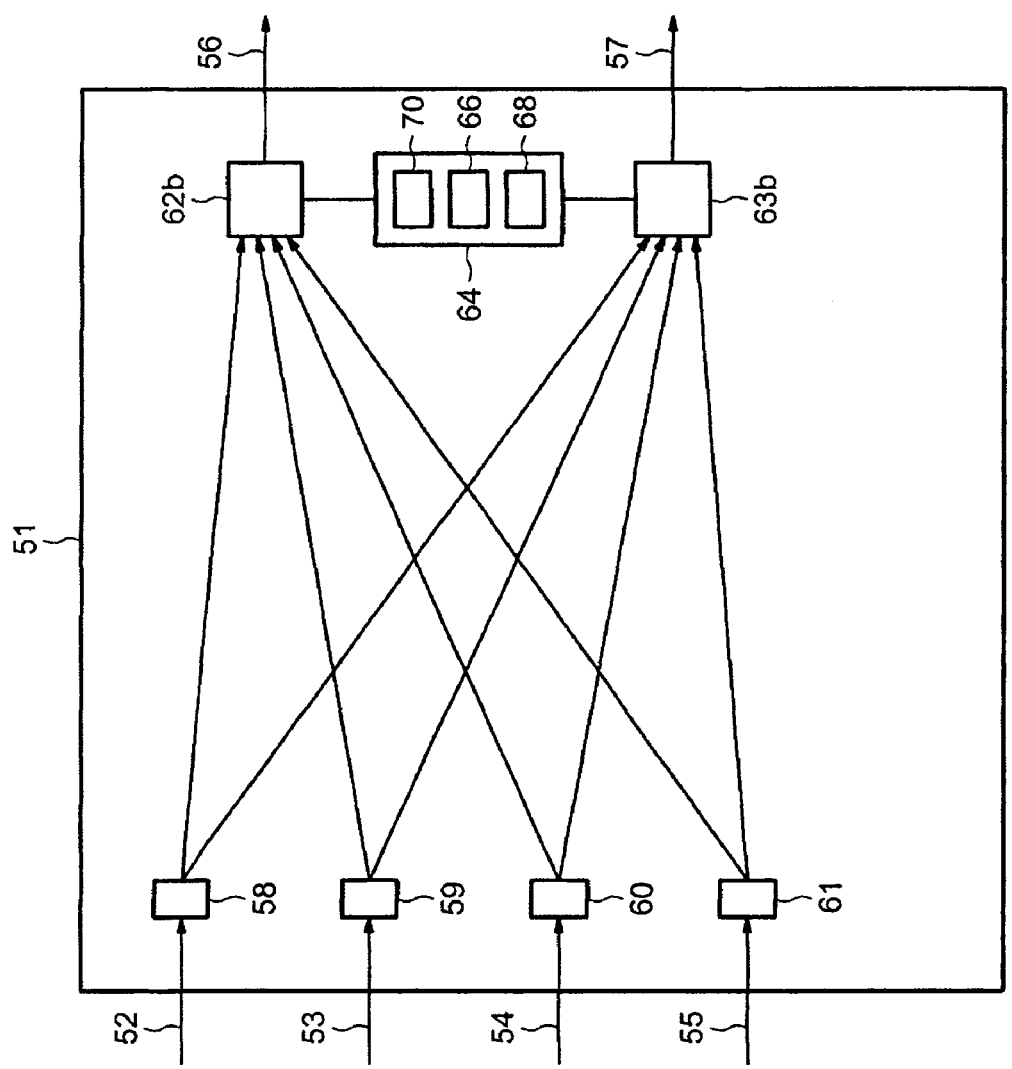
FIG. 6 illustrates a message switching system according to an aspect of the invention.

It will be noted that these equations remain valid in the case of a system with multiple choices on a number of outputs as illustrated in FIGS. 6 and 7, because in this situation it is the cases with a number of simultaneous FullGnt that are being processed.

As illustrated in FIG. 5, a message switching system 51 comprises four inputs 52, 53, 54, 55, and two independent outputs 56, 57.

Each input has an associated routing module. The first, second, third and fourth inputs 52, 53, 54, 55 respectively comprise a first, second, third and fourth routing modules 58, 59, 60, 61.

The outputs 56, 57 respectively comprise a dedicated arbitration module 62, 63.

The arbitration modules 62, 63 respectively cooperate with a management module 64, 65.

The management modules 64, 65 respectively comprise an initialization module 66, 67, an updating module 68, 69 and a storage module 70, 71 for the relative orders OR(i,j).

Any request that has a dynamic priority greater than that of another request takes priority over the latter, and if two requests have the same dynamic priority level, the priority is the one given by the relative orders OR(i,j) of the corresponding inputs.

The term "dynamic priority" is used to mean a priority signal (or service quality signal) associated with a request at the input of a message switching system.

Such a device makes it possible to manage emergency situations while retaining as much as possible a certain equity between the inputs.

If two requests have the same dynamic priority level, then the priority is given to the oldest request, and if a number of requests of the same dynamic priority level arrive simultaneously, the priority is given to the one whose input was last assigned the output the longest time ago.

In FIG. 6, the elements having the same references as in FIG. 5 are the same.

The management module 64 is common to the two arbitration modules 62b and 63b. In FIG. 6, the double arbiter comprising the two modules 62b and 63b must choose two different requests simultaneously for the two outputs 56 and 57 that are equivalent. The two modules share the management module 64.

FIG. 7 represents a variant of the system of FIG. 6, in which two double arbiters according to FIG. 6 are used in parallel. Also, the management module 64 is shared. The elements having the same references are the same.

The two arbitration modules 62c, 63c, are both dedicated to the two outputs 56, 57. Each arbitration module 62c and 63c therefore comprises a double arbiter comprising the modules 62b and 63b as illustrated in FIG. 6.

Furthermore, an assignment module 72 cooperates with the two arbitration modules 62c, 63c, and a counting module 77 controls the assignment module 72.

In a system, as illustrated in FIGS. 5 and 6, the aim is to determine, out of the inputs presenting a request, the one for which there is no other input with a higher relative priority, and for a system as illustrated in FIGS. 6 and 7, it is necessary to add the search for the input for which there is only one other input with a request having a higher relative order.

The fact that for a given input i (with request) there is no non-zero OR(i,j) with j different from i is detected.

Furthermore, the fact that for a given input (with request) there is one and only one non-zero OR(i,j) with j different from i is determined.

A double arbiter is constructed by adding for each input a second computation tree based on AND/OR cells while keeping a single table of the relative orders stored in the storage module 70, and the same initialization and updating modules.

This makes it possible to select two requests out of a plurality of requests without paying the cost of two independent arbitration modules, both in terms of execution time and in terms of number of gates used.

This is produced, for example, by means of the assembly of FIG. 8.

The signal Req(i) is transmitted as input to two logical ANDs 75 and 76.

A counting module 77 delivers as output a signal representing the detection of a count equal to zero as input to the logical AND 75 which delivers as output Grant1(i).

Furthermore, the counting module 77 delivers as output a signal representing the detection of a count at one as an input to the logical AND 76 which delivers as output Grant2(i).

For i<j, a plurality of logical ANDs 78 receive as input Req(j) and OR(i,j), and transmit their output signal, inverted by an inverter 81, to the counting module 77.

For i>j, logical ANDs 79 receive as input Req(j) and OR(i,j) inverted by inverters 80, and deliver their output signal, inverted by an inverter 81, to the counting module 77.

FIG. 8 illustrates how the selection signals Grant1(i) and Grant2(i) of the input i are calculated from the relative orders OR(i,j) of the other inputs relative to the input i, for a double arbiter.

Since the complexity is greater, there is a limit of two priority levels: priority and non-priority.

Since the computation trees for the signals Grant1(i) and Grant2(i) are inexpensive compared to the shared device (see FIG. 3), duplicating the double arbiter is reduced to duplicating only its computation trees in order to have the computations performed in parallel. There is therefore a reduction in delays (parallelism) and a reduced cost (sharing of costly parts). The parallel connection of two double arbiters makes it possible to process in parallel and separately the priority requests (priority count).

The corresponding device is then similar to that of FIG. 3, except that the following applies:

UpdGrant(i)=(Grant(i)&Upd1)|(Grant2(i)&Upd2)

The priority requests are transmitted to a first arbitration module 62c and the non-priority requests are sent to a second arbitration module 63c. The storage 70, updating 68 and initialization 66 modules are common to both arbitration modules 62c, 63c. At the same time, with the counting module 77, it is determined whether there are one, zero or several priority requests.

In the case where there is no priority request, only the two results of the second arbitration module 63c are of interest. In the case where there is only one priority request, the corresponding input is necessarily selected on the Grant1 of the first arbitration module 62c and the second input corresponds to the selection on the Grant1 of the second arbitration module 63c. In the other cases, there are at least two priority requests and only the results of the first arbitration module 62c are of interest.

Such a system has a theoretical arbitration time corresponding to approximately 1.5 log(n)+5 gates, and is therefore very rapid. With the OR(i,j) described previously, the age of the requests and the time elapsed since the last Grant can be taken into account, so the arbitration remains totally equitable.

Given the low number of logic gates involved, the computation trees of the double arbiter are duplicated and the table of relative orders of the storage module 70, and the table updating 68 and initialization 66 modules are shared, the first arbitration module 62c being dedicated to the priority requests and the second arbitration module 63c being dedicated to the non-priority requests. Thus, a double arbiter is obtained with priority filtering using a double arbiter, that is, four arbitration trees pooling the same relative orders OR(i,j).

A count of the number of priority requests provides a way of selecting, if there is more than one priority request, the two inputs with priority requests that have the highest relative orders, if there is only one priority request, the input with priority request and the one with a non-priority request for which the relative order is the higher, and if there is no priority request, the two inputs with non-priority requests for which the relative orders are the highest.

The relative orders are, furthermore, fixed according to the seniority of the requests. When a request disappears or obtains the output, the respective inputs have a priority returned to the minimum priority, the relative orders between these inputs remaining unchanged. Any new request on the input j, without output assignment for the input i or the input j and without the disappearance of the request on the input i, sets the relative order OR(i,j) to 0.

In such a system, only the computation trees of the Grant1(i) and Grant2(i) are doubled, so the increase in the number of gates remains limited to approximately 20%. Compared to the conventional solution that consists in placing two arbitration modules in series, the gains in speed and surface area are significant.

The invention claimed is:

1. A message switching system in a communication network, on a silicon chip, comprising:
   at least two inputs;
   at least one output;
   first arbitration means dedicated to said output; and
   management means wherein the management means is configured to:
      determine a relative order, OR(i,j), of one input relative to another input, for any pair of separate inputs belonging to the system, wherein said relative order OR(i,j) has a binary value;
      send requests for the assignment of said output; and
      assign said relative order to said output
      wherein said management means comprises:
         storage means configured to store said relative orders OR(i,j);
         initialization means configured to initialize said relative orders OR(i,j) such that only one of said inputs takes priority on initialization; and
         updating means configured to update all of said relative orders when a new request arrives at said first arbitration means, or when said output is assigned to one of said inputs.

2. The system according to claim 1, in which said management means is configured to assign the relative order OR(i,j) of one input relative to another input, for any pair of separate inputs belonging to the system, according to the order of arrival of the corresponding requests, the input for which the corresponding request has arrived first taking priority, and wherein said management means is further configured, when a number of requests arrive simultaneously, to assign the relative order of one input relative to the other, for any pair of separate inputs belonging to the system, such that one input takes priority over another input when said output has been recently assigned to said input before the last assignment of said output to the other input.

3. The system according to claim 2, further comprising filtering means configured to filter the or each output assignment request sent by inputs to said output by selecting the or each highest priority and identical priority requests out of the or each assignment request, when said requests can be of different priorities.

4. The system according to claim 3, in which said management means is configured, when a single request is selected by said filtering means, to assign said output to said single request selected by said filtering means, when a number of requests are selected by said filtering means and one of said selected requests has arrived before the others, to assign said output to said request arriving before the others out of the selected requests, and when a number of requests are selected by said filtering means and have arrived simultaneously before the other selected requests, to assign said output to the request having the relative order that is highest out of said requests arriving simultaneously before the others.

5. The system according to claim 1, in which said updating means is also configured to process a request, sent early by one of said inputs and disappearing before said output is assigned to it, as if said output had been assigned to it.

6. The system according to claim 1, in which the relative order $OR(i,j)$ of a pair of separate inputs $i,j$ belonging to the system is one when the input $j$ takes priority over the input $i$, and zero when the input $i$ takes priority over the input $j$.

7. The system according to claim 1, in which the relative order $OR(i,j)$ of a pair of separate inputs $i,j$ belonging to the system is zero when the input $j$ takes priority over the input $i$, and one when the input $i$ takes priority over the input $j$.

8. The system according to claim 6, in which said storage means is configured to store said relative orders $OR(i,j)$, for any pair of inputs belonging to the system such that $i<j$.

9. The system according to claim 6, in which said storage means is configured to store said relative orders $OR(i,j)$ for any pair of inputs belonging to the system such that $i>j$.

10. The system according to claim 1, further comprising second arbitration means dedicated to a second output said first and second arbitration means being configured to determine the input, corresponding to a request, to which said second output is assigned, such that only one other input has a higher priority request.

11. The system according to claim 10, further comprising third and fourth arbitration means, mounted in parallel forming a second double arbiter, means of assigning said two outputs, cooperating with said first and second arbitration means mounted in parallel and forming a first double arbiter, and with said second double arbiter, said first double arbiter receiving the priority requests, and said second double arbiter receiving the non-priority requests, said requests having only two possible priority levels, priority or non-priority.

12. The system according to claim 11, in which, when at least two priority requests are received by said first double arbiter, said assignment means assign said two outputs to the two priority requests having the highest relative orders.

13. The system according to claim 11, in which, when a single priority request is received by said first double arbiter, said assignment means assign said two outputs to said priority request and to the non-priority request having the highest relative order received by said second double arbiter.

14. The system according to claim 11, in which, when no priority request is received by said first double arbiter, said assignment means assign said two outputs to the two non-priority requests having the highest relative orders received by said second double arbiter.

15. The system according to claim 7, in which, said storage means is configured to store said relative orders $OR(i,j)$, for any pair of inputs belonging to the system such that $i<j$.

16. The system according to claim 7, in which, said storage means is configured to store said relative orders $OR(i,j)$ for any pair of inputs belonging to the system such that $i>j$.

* * * * *

UNITED STATES PATENT AND TRADEMARK OFFICE
CERTIFICATE OF CORRECTION

PATENT NO. : 7,639,704 B2 Page 1 of 1
APPLICATION NO. : 11/484837
DATED : December 29, 2009
INVENTOR(S) : Philippe Boucard et al.

It is certified that error appears in the above-identified patent and that said Letters Patent is hereby corrected as shown below:

Column 11, Line 35; replace:
"second arbitration means dedicated to a second output said" with
-- second arbitration means dedicated to a second output, said --

Signed and Sealed this

Twenty-second Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,639,704 B2  Page 1 of 1
APPLICATION NO. : 11/484837
DATED : December 29, 2009
INVENTOR(S) : Boucard et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 654 days.

Signed and Sealed this

Ninth Day of November, 2010

David J. Kappos
*Director of the United States Patent and Trademark Office*